Patented Aug. 24, 1943

2,327,644

UNITED STATES PATENT OFFICE 2,327,644

VERMIFUGE AND METHOD OF MAKING SAME

Arthur H. Howard, Toronto, Ontario, Canada

No Drawing. Application December 22, 1939, Serial No. 310,607. In Canada November 6, 1939

4 Claims. (Cl. 167—53.1)

The principal objects of this invention are to produce a vermifuge particularly adaptable for use with fowl which will not only be effective in killing and dislodging the parasites but will also produce a curative effect in otherwise cleansing the intestinal tract.

It has been known that the areca or betel nut in ground or pulverized form has been used as a vermifuge, and it is also known that a bromide produced from areca nuts will decimate parasites, but there are many practical difficulties found in the use of ground or pulverized areca nuts and the cost of preparation of a bromide of areca nuts is prohibitory in connection with the treatment of fowl or animals.

The present invention consists in a novel product and the method of procuring or compounding same whereby the active principle of the areca nut is attained in a hitherto unknown manner by the saturation of the areca nuts, preferably in ground or pulverized form, with a solution of hydrochloric acid.

In the production of the areca nut extract the acid which is to be utilized for the separation of the active principle is applied as a 5% solution, that is to say, 5% of acid to 95% water. The ground or pulverized areca nut is immersed in the acid solution and is permitted to saturate for a period of from twenty-four to forty-eight hours.

The resultant liquid has incorporated therein a very small quantity of a nicotine alkaloid in the proportion of .0038 oz. to 3 oz. of the solution.

The use of this material is carried out in a very dilute form with approximately 3 oz. of the prepared solution to three gallons of water. This extremely dilute form of the extract is given to fowl in drinking utensils and it is found to be extremely effective in the clearing of the alimentary canal of parasites and the fibroid condition resultant from the presence of such parasites, the result of the treatment being that the bird returns to health very quickly.

It will be appreciated that the characteristics of the areca nut are well known and that the chief alkaloid $C_8H_{13}NO_2$ is a methyl ester of arecaidine in the form of arecoline hydrobromate which is produced by extraction by ether.

The present invention differs from this known process in that hydrochloric acid is used to extract the active principle that is desired and found to be extremely useful, accomplishing results not hitherto obtainable by previously known extracts of the areca nut.

What I claim as my invention is:

1. As an improved vermifuge, a hydrochloric acid extract of the areca nut.

2. A vermifuge which contains the product of a mixture of areca nuts and a substantially 5% hydrochloric acid solution.

3. A method of preparing a vermifuge consisting in saturating ground areca nut in a 5% solution of hydrochloric acid to extract the active principle therefrom, then further diluting the extract.

4. A method of preparing a vermifuge comprising saturating ground areca nuts in a 5% solution of hydrochloric acid for a period of from twenty-four to forty-eight hours, producing a solution which when finally diluted in the proportion of 3 oz. of the resultant solution with substantially three gallons of water will exert a strong parasite-killing and fibroid-eliminating action in the alimentary canal of fowls.

ARTHUR H. HOWARD.